United States Patent Office 2,918,468
Patented Dec. 22, 1959

2,918,468

DIALKYL PYRAZINYL PHOSPHOROTHIOATES

James K. Dixon, Riverside, and Shirley Du Breuil and Nancy L. Boardway, Stamford, Conn., assignors to American Cyanamid Company, New York, N.Y., a corporation of Maine No Drawing. Application September 6, 1957
Serial No. 682,278

9 Claims. (Cl. 260—250)

The present invention relates to new and useful phosphate esters and the method of preparation thereof.

These new esters are the O,O-dialkyl O-(2-pyrazinyl) phosphorothioates which may be represented by the general formula $$\begin{array}{c} R-O \\ R'-O \end{array} \!\!\!\! \begin{array}{c} S \\ \| \\ P-O \end{array} \!\!\!\! \begin{array}{c} N \\ \diagup \\ Z \end{array} \!\!\!\! \begin{array}{c} X \\ \diagdown \\ Y \end{array}$$

(I)

wherein R and R' are chosen from the group of lower alkyl radicals such as methyl, ethyl, propyl and butyl, and X, Y and Z represent a member of the group consisting of hydrogen, a halogen, a phenyl radical and a lower alkyl radical.

Because these new esters are derived in part from hydroxypyrazine compounds which exist as tautomers, a plausible argument can be made that Formula I above does not cover all the possible isomeric and tautomeric equivalents. It is to be understood that Formula I above is used in a generic sense to represent the compounds even though other representative formulae can be written.

The above compounds may be readily prepared by reacting a dialkyl phosphorochloridothioate of the formula $$\begin{array}{c} R-O \\ R'-O \end{array} \!\!\!\! \begin{array}{c} S \\ \| \\ P-Cl \end{array}$$

in which R and R' have the meaning shown above, with an alkali metal salt of an hydroxypyrazine of the formula $$\text{alkali metal}-O \!\!\!\! \begin{array}{c} N \\ \diagup \\ Z \end{array} \!\!\!\! \begin{array}{c} X \\ \diagdown \\ Y \end{array}$$

in which X, Y and Z have the meaning shown above, in an inert solvent.

The compounds of the present invention may also be prepared by reacting the dialkyl phosphorochloridothioate with the hydroxypyrazine in an inert solvent in the presence of a hydrogen chloride acceptor such as the alkali metal and alkaline earth metal carbonates. For example, in the preparation of O,O-diethyl O-(5,6-diethyl-2-pyrazinyl) phosphorothioate, the reaction may be illustrated as follows:

$$\begin{array}{c} C_2H_5-O \\ C_2H_5-O \end{array} \!\!\!\! \begin{array}{c} S \\ \| \\ P-Cl \end{array} + HO \!\!\!\! \begin{array}{c} N \\ \diagup \\ N \end{array} \!\!\!\! \begin{array}{c} CH_3 \\ CH_3 \end{array} + Na_2CO_3 \longrightarrow$$

$$\begin{array}{c} C_2H_5-O \\ C_2H_5-O \end{array} \!\!\!\! \begin{array}{c} S \\ \| \\ P-O \end{array} \!\!\!\! \begin{array}{c} N \\ \diagup \\ N \end{array} \!\!\!\! \begin{array}{c} CH_3 \\ CH_3 \end{array} + NaHCO_3 + NaCl$$

The reaction may be carried out at temperatures within the range of from about 10° to 100° C., and preferably between 20° and 60° C.

Suitable inert solvents for the reaction include water, dimethyl formamide, dioxane, N-methyl-2-pyrrolidone, acetonitrile, benzene, toluene, xylene, the lower aliphatic monohydric alcohols, ketones such as acetone, methyl ethyl ketone, methyl isobutyl ketone, methyl benzyl ketone and cyclohexanone, and aliphatic esters such as ethyl acetate, 2-ethylhexyl acetate, methyl propionate, ethyl butyrate and isopropyl butyrate.

The hydroxypyrazines utilized in the present process are readily prepared by the reaction of α-aminocarboxylic acid amides with 1,2-dicarbonyl compounds according to the methods disclosed in the Journal of the American Chemical Society 74, 1580–4 (1952). The reaction of glycine amide with diacetyl to produce 2-hydroxy-5,6-dimethylpyrazine may be illustrated as follows:

$$\begin{array}{c} CH_2NH_2 \\ | \\ C=O \\ | \\ NH_2 \end{array} + \begin{array}{c} CH_3 \\ | \\ C=O \\ | \\ C=O \\ | \\ CH_3 \end{array} \longrightarrow HO \!\!\!\! \begin{array}{c} N \\ \diagup \\ N \end{array} \!\!\!\! \begin{array}{c} CH_3 \\ CH_3 \end{array}$$

The alkali metal salts of the hydroxypyrazines may be prepared by reaction of the hydroxypyrazine with an alkali metal hydroxide in water, followed by precipitation with ethanol.

The dialkyl phosphorochloridothioates utilized in the present process may be prepared according to the methods disclosed in U.S. Patent No. 2,692,893.

The following examples will further illustrate the invention.

Example 1

O,O-diethyl O-(2-pyrazinyl) phosphorothioate $$\begin{array}{c} C_2H_5-O \\ C_2H_5-O \end{array} \!\!\!\! \begin{array}{c} S \\ \| \\ P-O \end{array} \!\!\!\! \begin{array}{c} N \\ \diagup \\ N \end{array}$$

To a slurry of 11.8 g. (0.1 mol) of the sodium salt of 2-hydroxypyrazine in 150 cc. of N-methyl-2-pyrrolidone, 18.9 g. (0.1 mol) of O,O-diethyl phosphorochloridothioate was added with stirring. The temperature of the mixture rose immediately to 50° C., and stirring was continued at about 40° C. for three hours. The reaction mixture was filtered, and the precipitate was washed with a small portion of N-methyl-2-pyrrolidone. The combined filtrates were concentrated to remove the solvent, and the resulting residue was dissolved in 100 cc. of toluene. The toluene solution was washed with 10% aqueous sodium carbonate and then with saturated sodium chloride solution to neutrality. After drying over anhydrous magnesium sulfate, the toluene solution was concentrated in vacuo and the residue was filtered through a Hyflo-magnesium sulfate mat to give 19.9 g. (73% of theory) of product, a clear amber-colored liquid having a refractive index $n_D^{25}$ 1.5131.

*Analysis.*—Theory P, 12.48; N, 11.29. Found P, 12.48; N, 11.34.

Example 2

Example 1 was repeated using 175 cc. of methylisobutyl ketone as the solvent in place of the N-methyl-2-pyrrolidone. The ketone solvent was not replaced with toluene before the aqueous washes. The yield of the product was 23.1 g. (85% of theory).

The phosphate esters of the examples listed in the following table were prepared according to the procedure of Example 1 employing equimolar quantities of the dialkyl phosphorochloridothioate and the alkali metal salt of the hydroxypyrazine.

| Example Number | Phosphate Ester | Refractive Index | Percent Yield |
|---|---|---|---|
| 3 | $C_2H_5-O$, $C_2H_5-O$, P(=S)-O-(pyrazinyl-CH_3) | $n_D^{25}$ 1.5005 | 56 |
| 4 | $C_2H_5-O$, $C_2H_5-O$, P(=S)-O-(pyrazinyl-CH_3, CH_3) | $n_D^{25}$ 1.5078 | 79 |
| 5 | $C_2H_5-O$, $C_2H_5-O$, P(=S)-O-(pyrazinyl-CH_3, CH_3, CH_3) | $n_D^{25}$ 1.5049 | 71 |
| 6 | $i-C_3H_7-O$, $i-C_3H_7-O$, P(=S)-O-(pyrazinyl-Cl) | $n_D^{25}$ 1.5031 | 58 |

*Example 7*

O,O-diethyl O-(6-chloro-2-pyrazinyl) phosphorothioate

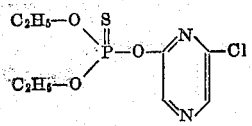

To a slurry of 13.5 g. (0.1 mol) of 6-chloro-2-hydroxypyrazine and 10.6 g. (0.1 mol) of sodium carbonate in 175 cc. of dimethyl formamide, 18.9 g. of O,O-diethylphosphorochloridothioate was added with stirring. The mixture was heated at 40–45° C. for a period of three hours. 22.6 g. (80% of theory) of the phosphate ester was recovered from the reaction mixture by the procedure employed in Example 1. The product was a clear orange colored liquid having a refractive index $n_D^{25}$ 1.5187.

*Analysis.*—Theory P, 10.96; N, 9.91. Found P, 10.91; N, 9.77.

The phosphate esters of the examples listed in the following table were prepared according to the procedure of Example 7 employing equimolar quantities of the dialkyl phosphorochloridothioate, hydroxypyrazine and sodium carbonate.

| Example Number | Phosphate Ester | Refractive Index or Melting Point | Percent Yield |
|---|---|---|---|
| 8 | $C_2H_5-O$, $C_2H_5-O$, P(=S)-O-(pyrazinyl-phenyl) | 87–88° C. | 62 |
| 9 | $C_2H_5-O$, $C_2H_5-O$, P(=S)-O-(pyrazinyl-phenyl, phenyl) | $n_D^{25}$ 1.5984 | 80 |

Other typical phosphate esters of the present invention which may be prepared according to the procedure of Example 7 are:

O,O - dimethyl O - (5,6 - diphenyl - 2 - pyrazinyl) phosphorothioate
O,O-diethyl O-(6-bromo-2-pyrazinyl) phosphorothioate
O,O - diethyl O - (3 - phenyl - 2 - pyrazinyl) phosphorothioate
O,O - diethyl O - (5,6 - diethyl - 2 - pyrazinyl) phosphorothioate
O,O - diethyl O - (3 - chloro - 5,6 - dimethyl - 2 - pyrazinyl) phosphorothioate
O,O - diethyl O - (3 - ethyl - 5,6 - dichloro - 2 - pyrazinyl) phosphorothioate
O,O - dimethyl O - (5,6 - diethyl - 2 - pyrazinyl) phosphorothioate
O,O - dimethyl O - (3 - isopropyl - 2 - pyrazinyl) phosphorothioate
O,O - dimethyl O - (6 - chloro - 2 - pyrazinyl) phosphorothioate
O,O - diisopropyl O - (5 - ethyl - 2 - pyrazinyl) phosphorothioate
O,O - dipropyl O - (3 - phenyl - 2 - pyrazinyl) phosphorothioate
O,O - dibutyl O - (3,5,6 - trimethyl - 2 - pyrazinyl) phosphorothioate
O,O - dibutyl O - (6 - bromo - 2 - pyrazinyl) phosphorothioates
O,O - diisopropyl O - (2 - pyrazinyl) phosphorothioate
O,O - diisobutyl O - (5 - methyl - 2 - pyrazinyl) phosphorothioate The compounds of the present invention are highly active insecticides and acaricides and may be used as sprays in organic solvents, as emulsions in water or other non-solvents, or on solid carriers such as talcs, clays, diatomaceous earths and the like.

The marked activity of the phosphate esters in controlling various insects and mites is illustrated as follows:

*Ahpis rumicis.*—100% kill with esters of Examples 1, 3, 5, 6 and 8 above at a concentration of 0.001% in a solvent carrier consisting of 65% acetone and 35% water; 100% kill with esters of Examples 4 and 7 above at a concentration of 0.0001% in the same solvent carrier.

*German cockroach.*—80 to 100% kill with esters of Examples 1, 4, 6, 7 and 8 above at a concentration of 1.0% on solid carriers such as fuller's earth and Attapulgus clay.

*Tribolium confusum.*—100% kill with esters of Examples 1, 4, 7 and 8 above at a concentration of 1.0% on solid carriers such as talc and pyrophyllite.

*Milkweed bug.*—90 to 100% kill with esters of Examples 1, 7 and 8 above at a concentration of 1.0% on solid carriers such as pyrophyllite and Attapulgus clay.

*Southern armyworm.*—100% kill with esters of Examples 3, 5, 6, 8 and 9 above at a concentration of 0.1% in a solvent carrier consisting of 65% acetone and 35% water; 100% kill with esters of Examples 1, 4 and 7 above at a concentration of 0.01% in the same solvent carrier.

*Two-spotted mite.*—100% kill of active stages with esters of Examples 1, 3, 4, 6, 7 and 8 above at a concentration of 0.01% in a solvent carrier consisting of 65% acetone and 35% water; 95 to 100% kill of mite eggs and nymphs with esters of Examples 1, 7 and 9 above at a concentration of 0.1% in the same solvent carrier.

While the invention has been described with particular reference to specific embodiments, it is to be understood that it is not to be limited thereto, but is to be construed broadly and restricted solely by the scope of the appended claims.

We claim:
1. A phosphate ester of the general formula

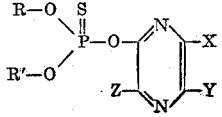

wherein R and R' represent a member of the group consisting of lower alkyl radicals, and X, Y and Z represent a member of the group consisting of hydrogen, a halogen, a phenyl radical, and a lower alkyl radical.

2. O,O-diethyl O-(2-pyrazinyl) phosphorothioate.
3. O,O-diethyl O-(5,6-dimethyl-2-pyrazinyl) phosphorothioate.
4. O,O-diethyl O-(6-chloro-2-pyrazinyl) phosphorothioate.
5. O,O-diethyl O-(3,5,6-trimethyl-2-pyrazinyl) phosphorothioate.
6. O,O-diethyl O-(5-phenyl-2-pyrazinyl) phosphorothioate.
7. A method of preparing a phosphate ester of the general formula

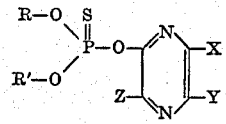

wherein R and R' represent a member of the group consisting of lower alkyl radicals, and X, Y and Z represent a member of the group consisting of hydrogen, a halogen, a phenyl radical, and a lower alkyl radical, which comprises reacting a dialkyl phosphorochloridothioate of the formula

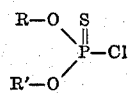

wherein R and R' have the meaning shown above, with an alkali metal salt of an hydroxypyrazine of the formula

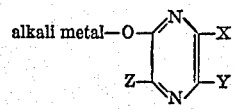

wherein X, Y and Z have the meaning shown above, in an inert solvent, and recovering the thus-formed phosphate ester from the reaction mixture.

8. The method of claim 7 in which the reaction is carried out at a temperature within the range of from about 10° C. to 100° C.

9. The method of preparing a phosphate ester of the general formula

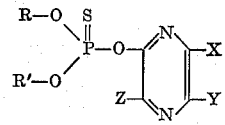

wherein R and R' represent a member of the group consisting of lower alkyl radicals, and X, Y and Z represent a member of the group consisting of hydrogen, a halogen, a phenyl radical, and a lower alkyl radical, which comprises reacting a dialkyl phosphorochloridothioate of the formula

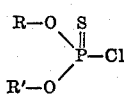

wherein R and R' have the meaning shown above, with an hydroxypyrazine of the formula

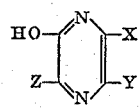

wherein X, Y and Z have the meaning shown above, in an inert solvent in the presence of a hydrogen chloride acceptor at a temperature within a range of from about 20° to 60° C., and recovering the thus-formed ester from the reaction mixture.

References Cited in the file of this patent
UNITED STATES PATENTS

| | | |
|---|---|---|
| 2,754,243 | Gysin et al. | July 10, 1956 |
| 2,759,938 | Du Breuil | Aug. 21, 1956 |

FOREIGN PATENTS

| | | |
|---|---|---|
| 713,278 | Great Britain | Aug. 11, 1954 |

OTHER REFERENCES

Richter's Organic Chemistry, vol. IV, pp. 271 and 282, third edition (1947).